(12) United States Patent
Lim

(10) Patent No.: US 11,754,851 B2
(45) Date of Patent: Sep. 12, 2023

(54) LENS DRIVING APPARATUS HAVING THREE BALL MEMBERS AND OPENING IN FRAME

(71) Applicant: SAMSUNG ELECTRO-MECHANICS CO., LTD., Suwon-si (KR)

(72) Inventor: Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 303 days.

(21) Appl. No.: 16/927,011

(22) Filed: Jul. 13, 2020

(65) Prior Publication Data

US 2020/0341291 A1 Oct. 29, 2020

Related U.S. Application Data

(63) Continuation of application No. 15/161,667, filed on May 23, 2016, now Pat. No. 10,747,013.

(30) Foreign Application Priority Data

Nov. 13, 2015 (KR) .......................... 10-2015-0160001

(51) Int. Cl.
  *G02B 7/04* (2021.01)
  *G02B 7/08* (2021.01)
  *G02B 27/64* (2006.01)
  *H04N 23/57* (2023.01)
  (Continued)

(52) U.S. Cl.
  CPC ............. *G02B 27/646* (2013.01); *G02B 7/08* (2013.01); *H04N 23/57* (2023.01); *H04N 23/687* (2023.01); *G02B 7/04* (2013.01); *G03B 5/00* (2013.01)

(58) Field of Classification Search
  CPC .......... G02B 27/646; G03B 2205/0007–0038; H04N 5/23287
  See application file for complete search history.

(56) References Cited

U.S. PATENT DOCUMENTS

| 8,928,977 B2 | 1/2015 | Yasuda |
| 9,618,770 B2 | 4/2017 | Park et al. |
| 2006/0269262 A1 | 11/2006 | Shin et al. |

(Continued)

FOREIGN PATENT DOCUMENTS

| CN | 102262329 A | 11/2011 |
| CN | 104977783 A | 10/2015 |

(Continued)

OTHER PUBLICATIONS

Japanese Office Action dated Jul. 4, 2017 in corresponding Japanese Patent Application No. 2016-136801 (4 pages in English and 2 pages in Japanese).

(Continued)

*Primary Examiner* — Ryan S Dunning
(74) *Attorney, Agent, or Firm* — NSIP Law

(57) ABSTRACT

A lens driving apparatus and a camera module including the same are provided. A lens driving apparatus includes a shake compensation unit configured to move in directions perpendicular to an optical axis, and ball members supporting the shake compensation unit, such that a degree of freedom for one of the ball members is different from a degree of freedom for another of the ball members.

14 Claims, 16 Drawing Sheets

(51) Int. Cl.
*H04N 23/68* (2023.01)
*G03B 5/00* (2021.01)

(56) References Cited

U.S. PATENT DOCUMENTS

| | | |
|---|---|---|
| 2008/0231955 A1 | 9/2008 | Otsuka |
| 2011/0013283 A1 | 1/2011 | Sato |
| 2011/0292509 A1 | 12/2011 | Yasuda |
| 2013/0162896 A1 | 6/2013 | Kang et al. |
| 2014/0362284 A1 | 12/2014 | Shin et al. |
| 2015/0116514 A1 | 4/2015 | Kim et al. |
| 2015/0146025 A1 | 5/2015 | Bang et al. |
| 2015/0256727 A1* | 9/2015 | Kim .................. G03B 5/04 348/208.12 |
| 2015/0296112 A1 | 10/2015 | Park et al. |
| 2016/0097937 A1* | 4/2016 | Lam .................. G02B 27/646 359/557 |
| 2016/0161756 A1 | 6/2016 | Liu et al. |
| 2016/0252746 A1 | 9/2016 | Kim et al. |
| 2016/0341974 A1 | 11/2016 | Kishine |

FOREIGN PATENT DOCUMENTS

| | | |
|---|---|---|
| EP | 2938063 A2 | 10/2015 |
| JP | 2008-233526 A | 10/2008 |
| JP | 2008-287159 A | 11/2008 |
| JP | 2008-304850 A | 12/2008 |
| JP | 2011-39103 A | 2/2011 |
| JP | 2011-158714 A | 8/2011 |
| KR | 10-2007-0070145 A | 7/2007 |
| KR | 10-2013-0042794 A | 4/2013 |
| KR | 10-2014-0144126 A | 12/2014 |
| KR | 10-2015-0059997 A | 6/2015 |
| KR | 10-2015-0118005 A | 10/2015 |
| TW | 201523031 A | 6/2015 |
| TW | M505615 U | 7/2015 |

OTHER PUBLICATIONS

Taiwanese Office Action dated Jul. 10, 2017 in corresponding Taiwanese Patent Application No. 105117294 (8 pages in English and 9 pages in Chinese).
Japanese Office Action dated Apr. 3, 2018, in corresponding Japanese Application No. 2016-136801 (4 pages in English, 2 pages in Japanese).
English Translation of Anshita, JP 2011-039103, retrieved from https://dossier1.j-platpat.inpit.go.jp on Jun. 5, 2018.
Chinese Office Action dated Sep. 17, 2018, in corresponding Chinese Application No. 201610461745.7 (26 pages in English, 14 pages in Chinese).
Korean Office Action dated Aug. 29, 2019 in counterpart Korean Patent Application No. 10-2015-0160001 (13 pages in English and 8 pages in Korean).

\* cited by examiner

A-A'

B

C-C'

LENS DRIVING APPARATUS HAVING THREE BALL MEMBERS AND OPENING IN FRAME

CROSS-REFERENCE TO RELATED APPLICATION

This application is a continuation of U.S. patent application Ser. No. 15/161,667 filed on May 23, 2016, which claims the benefit under 35 U.S.C. § 119(a) of Korean Patent Application No. 10-2015-0160001 filed on Nov. 13, 2015, in the Korean Intellectual Property Office, the entire disclosures of which are incorporated herein by reference for all purposes.

BACKGROUND

1. Field

The following description relates to a lens driving apparatus and a camera module including the same.

2. Description of Related Art

The use of subminiature camera modules in mobile communications terminals such as smartphones, tablet PCs, notebook computers, and the like, has recently increased.

With the miniaturization of mobile communications terminals, the quality of images obtained by these terminals may be degraded because these terminals are often held by hands while images are captured. To obtain vivid images despite the instability introduced into the images due to the inadvertent shaking of hands holding the terminals, a technology that compensates for the effect of shaking is required.

An actuator for optical image stabilization (OIS) may be used to compensate for the involuntary shaking introduced by the instability of hands holding the terminals. An OIS actuator may move a lens module in a direction perpendicular to an optical axis direction to compensate for the involuntary shaking.

However, the use of an OIS actuator in a camera module tends to increase the size of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens driving apparatus includes a shake compensation unit configured to move in directions perpendicular to an optical axis, and ball members supporting the shake compensation unit, and a degree of freedom for one of the ball members is different from a degree of freedom for another of the ball members.

The degree of freedom for one of the ball members may be greater than the degree of freedom for another of the ball members.

One or more of the plurality of ball members may be movable in a rolling motion in a first axis direction perpendicular to the optical axis and a second axis direction perpendicular to the first axis direction, and one or more among a remainder of the ball members may be movable in a rolling motion in either the first axis direction or the second axis direction, but not both directions.

The ball members may include a first ball member movable in a rolling motion in a first axis direction perpendicular to the optical axis, a second ball member movable in a rolling motion in a second axis direction perpendicular to the first axis direction, and a third ball member movable in a rolling motion in both the first axis direction and the second axis direction.

The shake compensation unit may include guide grooves that accommodate the ball members therein, and one of the guide grooves may have a different shape from another of the guide grooves.

A plan view shape of a guide groove in which a ball member with a greatest degree of freedom is accommodated may be circular, and a plan view shape of a guide groove in which a ball member having a lesser degree of freedom is accommodated may be rectangular.

The shake compensation unit may include a lens holder attached to a lens barrel, the lens holder being supported by groups of the ball members that are disposed on different planes from each other.

The lens holder may include a magnet, and the magnet may be disposed between groups of the ball members that are disposed on different planes from each other.

The shake compensation unit may include a magnet, and a yoke part may be disposed to be spaced apart from the magnet in an optical axis direction.

A pressing force biased toward the yoke part may be applied to the shake compensation unit.

The general aspect of the lens driving apparatus may further include a focus adjustment unit configured to be movable in an optical axis direction, and the shake compensation unit may be configured to be movable together with the focus adjustment unit in the optical axis direction.

A plurality of magnets may be mounted on different surfaces of the focus adjustment unit.

A magnet mounted on one surface of the focus adjustment unit may face a coil, and a magnet mounted on another surface of the focus adjustment unit may face a position sensor.

A plurality of coils may be disposed to face the plurality of magnets, and a position sensor may be disposed at a position adjacent to one of the plurality of coils.

In another general aspect, a camera module includes a frame and a lens holder that are disposed in a carrier in an optical axis direction, a first ball member supporting the frame to be movable in a first axis direction perpendicular to the optical axis direction, a second ball member supporting the lens holder to be movable in a second axis direction perpendicular to the first axis direction, and a third ball member supporting the lens holder to be movable in the first axis direction and the second axis direction.

The first ball member may be disposed between the carrier and the frame.

The second ball member may be disposed between the frame and the lens holder.

The third ball member may be disposed between the carrier and the lens holder.

The first ball member may be movable in a rolling motion in the first axis direction. The second ball member may be movable in a rolling motion in the second axis direction. The third ball member may be movable in a rolling motion in the first axis direction and the second axis direction.

A magnet may be disposed on the lens holder, and a yoke part generating an attractive force with the magnet in the optical axis direction is disposed on the carrier.

An opening may be disposed in a portion of the frame corresponding to a region in which the magnet and the yoke part face each other in the optical axis direction.

The magnet and the yoke part may be disposed in a region in which the lens holder and the frame do not overlap each other in the optical axis direction.

The general aspect of the camera module may further include a housing accommodating the carrier therein, and the carrier may be configured to be movable in the optical axis direction within the housing.

In another general aspect, a camera module includes a lens barrel, a guide member disposed peripheral to the lens barrel to guide the lens barrel in an optical axis direction, a first ball member movable in a first axis direction perpendicular to the optical axis direction, a second ball member movable in a second axis direction perpendicular to both the first axis direction and the optical axis direction but not in the first axis direction, and a third ball member movable in both the first axis direction and the second axis direction, and the first ball member and the second ball member couple with the guide member to move the lens barrel in the first axis direction and the second axis direction.

The guide member may include a frame including a first groove that couples with the first ball member and a second groove that couples with the second ball member, and the third ball member may not couple with the frame.

The guide member may further include a lens holder configured to move together with the lens barrel, and the frame may movably couple with the lens barrel via the lens holder and at least one of the first ball member or the second ball member.

Other features and aspects will be apparent from the following detailed description, the drawings, and the claims.

Figure 1:
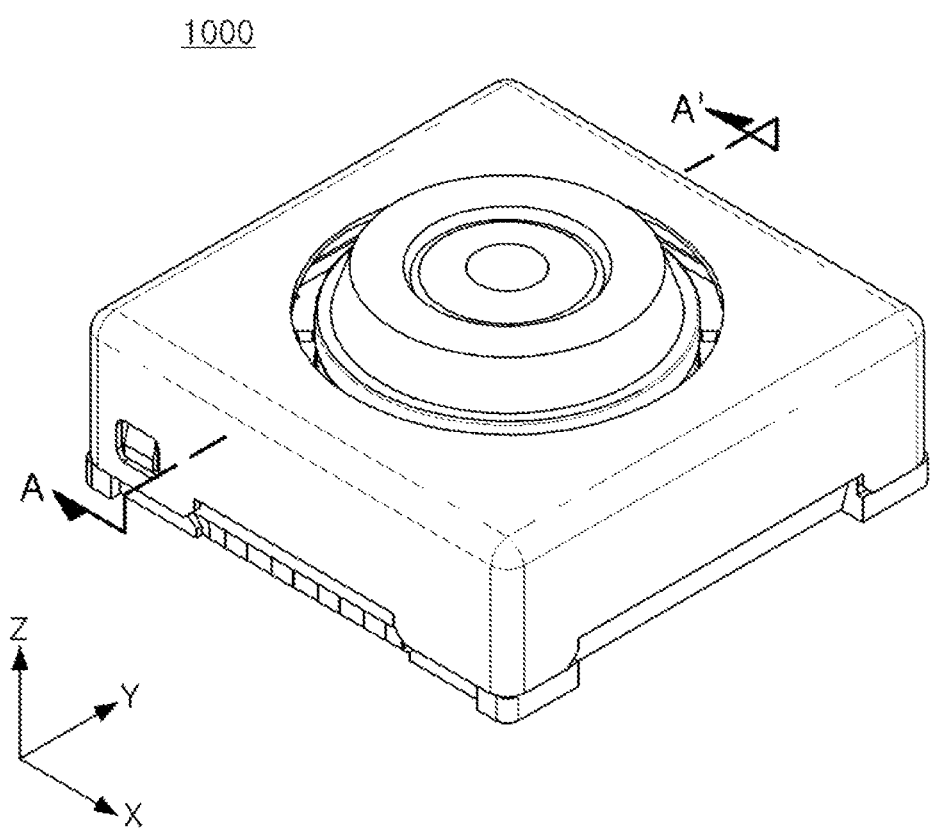
FIG. 1 is a perspective view of an example of a camera module.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing illustrated embodiments only and is not intended to be limiting of the present description. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views. In the drawings, for example, due to manufacturing techniques and/or tolerances, modifications of the shape shown may be estimated. Thus, embodiments of the present description should not be construed as being limited to the particular shapes of regions shown herein, for example, to include a change in shape results in manufacturing. The following embodiments may also be constituted by one or a combination thereof.

The contents of the embodiments described below may have a variety of configurations and propose only a required configuration herein, but are not limited thereto.

The following description relates to a lens driving apparatus and a camera module including the same. The lens driving apparatus and camera module may be applied to portable electronic devices such as mobile communications terminals, smartphones, tablet PCs, and the like.

A camera module is an optical device for capturing still or moving images. A camera module may include a lens that refracts light reflected from a subject and a lens driving apparatus that moves the lens in order to adjust a focus or to compensate for the shaking of the camera module while images are captured.

Figure 2:
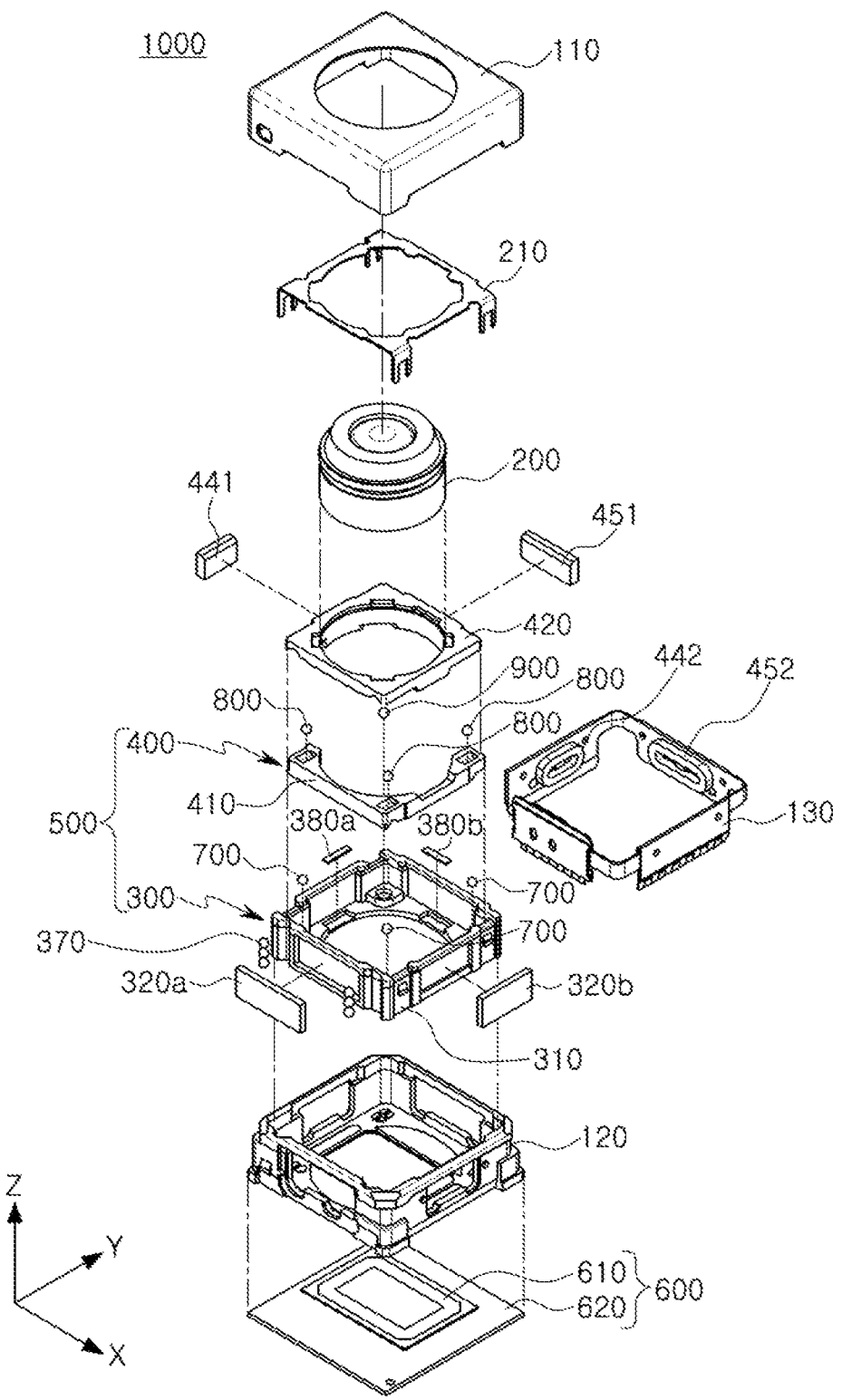
FIG. 2 is a schematic exploded perspective view of an example of a camera module according to FIG. 1.

FIG. 1 is a perspective view of an example of a camera module, and FIG. 2 is a schematic exploded perspective view of the camera module.

Referring to FIGS. 1 and 2, the camera module 1000 includes a lens barrel 200, a lens driving apparatus 500, an image sensor unit 600, a housing 120 and a case 110. The housing 120 and the case 110 accommodate the lens barrel 200 and the lens driving apparatus 500 therein. The lens driving apparatus 500 moves the lens barrel 200 within the housing 120 and the case 110. The image sensor unit 600 converts light incident through the lens barrel 200 into an electrical signal.

In this example, the lens barrel 200 has a hollow cylindrical shape so that a plurality of lenses for capturing an image of the subject may be accommodated therein, and the plurality of lenses is provided in the lens barrel 200 on an optical axis.

The number of lenses in the lens barrel 200 may be varied depending on a design of the lens barrel 200, and the respective lenses may have optical characteristics such as the same refractive index, different refractive indices, or the like.

The lens driving apparatus 500 may be an apparatus moving the lens barrel 200.

For example, the lens driving apparatus 500 may adjust a focus by moving the lens barrel 200 in an optical axis direction (a Z-axis direction) and compensate for the shaking of the camera module 1000 at the time of capturing images by moving the lens barrel 200 in directions perpendicular to the optical axis (a Z-axis).

The lens driving apparatus 500 includes a focus adjustment unit 300 for adjusting the focus and a shake compensation unit 400 for compensating for the shaking of the camera.

The image sensor unit 600 may be an apparatus that converts the light incident through the lens barrel 200 into an electrical signal.

In this example, the image sensor unit 600 includes an image sensor 610 and a printed circuit board 620 connected to the image sensor 610, and may further include an IR filter.

The IR filter may serve to block light in an infrared region in the light incident through the lens barrel 200.

The image sensor 610 may convert the light incident through the lens barrel 200 into an electrical signal. For example, the image sensor 610 may be a charge coupled device (CCD) or a complementary metal-oxide semiconductor (CMOS).

The electrical signal converted by the image sensor 610 may be output as an image through a display unit of the portable electronic device.

The image sensor 610 may be attached to the printed circuit board 620 and electrically connected to the printed circuit board 620 by a wire bond.

The lens barrel 200 and the lens driving apparatus 500 are accommodated in the housing 120.

In this example, upper and lower portions of the housing 120 include openings, and the lens barrel 200 and the lens driving apparatus 500 are accommodated in an internal space of the housing 120.

The image sensor unit 600 is disposed below the housing 120.

The case 110 may be coupled to the housing 120 to enclose an outer surface of the housing 120, and serve to protect internal components of the camera module.

Further, the case 110 may serve to block electromagnetic waves.

For example, the case 110 may block electromagnetic waves so that electromagnetic waves generated in the camera module do not affect other electronic component in the portable electronic device.

Further, because various electronic components in addition to the camera module are mounted in the portable electronic device, the case 110 may block electromagnetic waves so that electromagnetic waves generated in these electronic components may not affect the overall camera module 1000.

The case 110 may be formed of a metal to thereby be grounded via a ground pad provided in the printed circuit board 620, such that the case 110 may block the electromagnetic wave.

Figure 3:
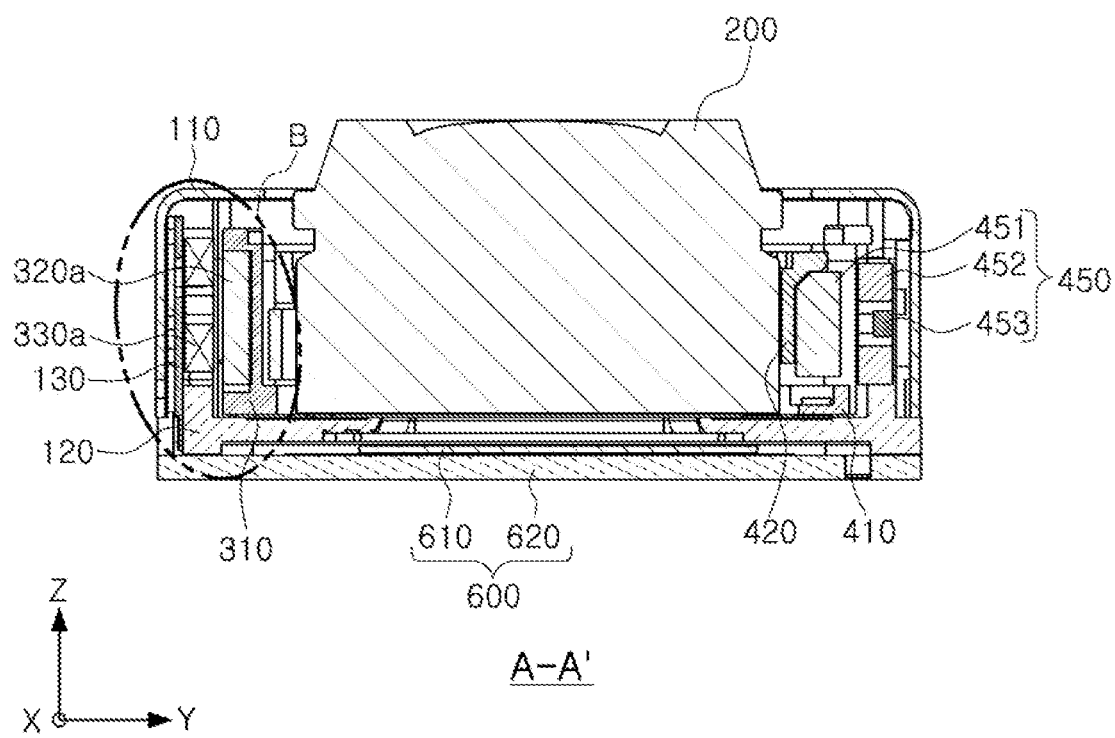
FIG. 3 is a cross-sectional view of an example of a camera module taken along line A-A' of FIG. 1.
Figure 4:
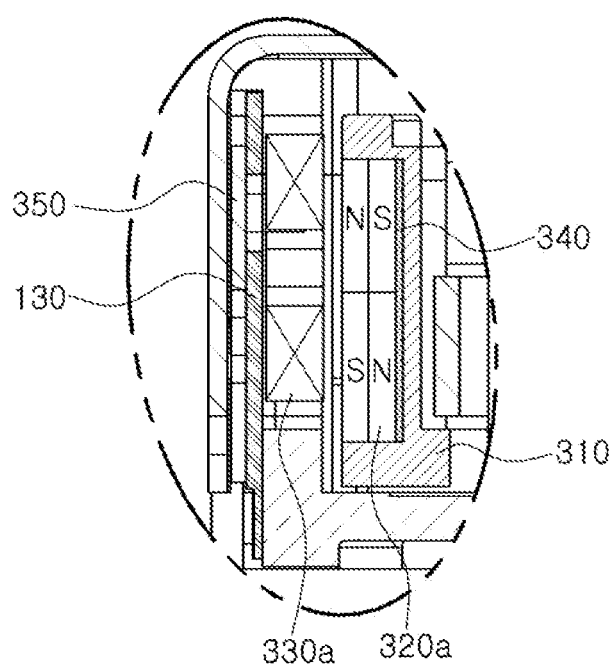
FIG. 4 is a schematic enlarged view of an example of a camera module in part B of FIG. 3.

FIG. 3 is a cross-sectional view taken along line A-A' of FIG. 1, and FIG. 4 is a schematic enlarged view of part B of FIG. 3.

Figure 5:
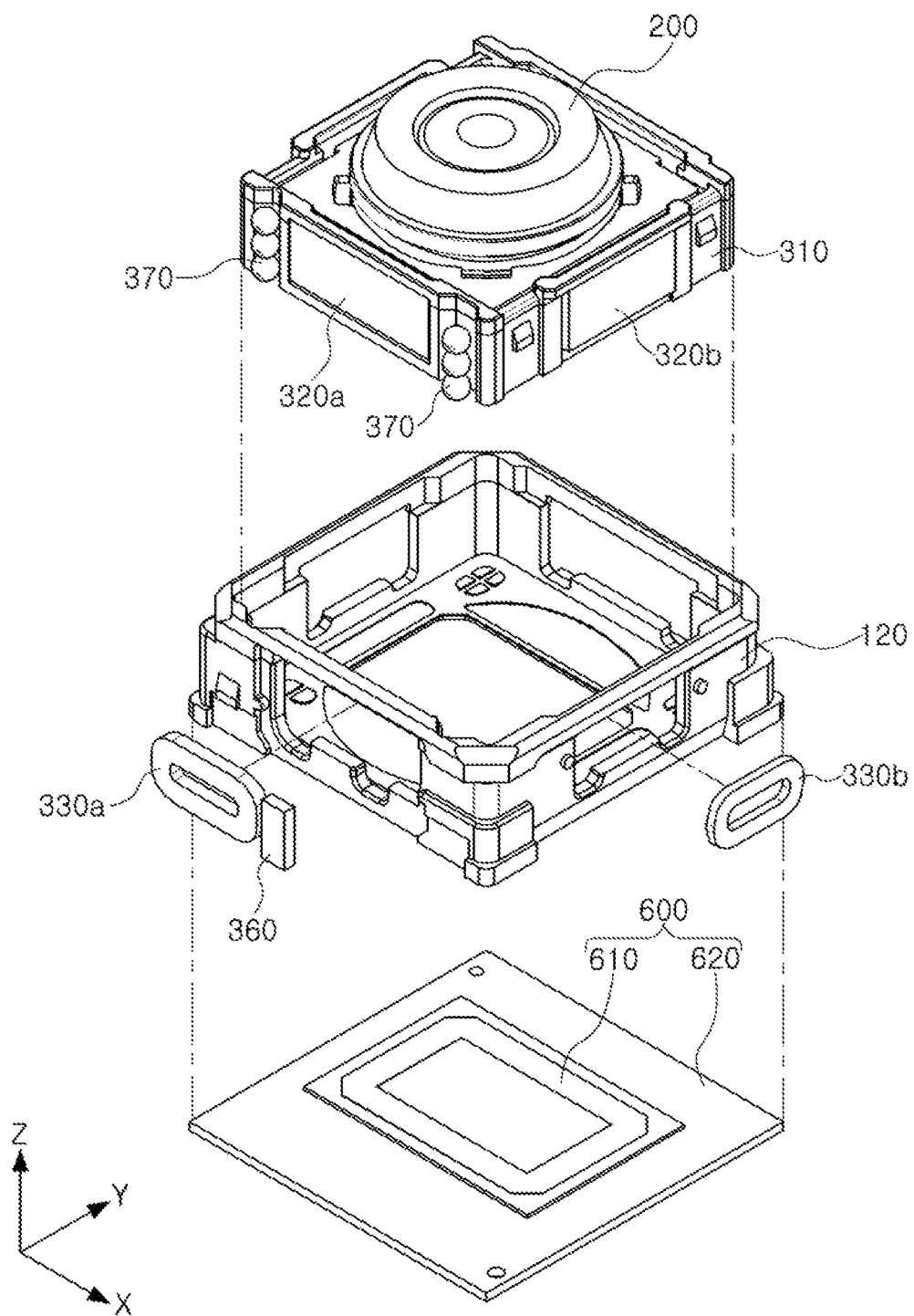
FIG. 5 is a partially exploded perspective view of an example of a camera module according to the present disclosure.

In addition, FIG. 5 is a partially exploded perspective view of the camera module according to the example illustrated in FIG. 2.

The focus adjustment unit 300 of the lens driving apparatus 500 will be described with reference to FIGS. 3 through 5.

The lens barrel 200 may be moved inside the lens driving apparatus 500 in order to adjust the camera lens to be in focus on a subject.

For instance, referring to the example illustrated in FIGS. 3 through 5, the focus adjustment unit 300 may move the lens barrel 200 in the optical axis direction (the Z-axis direction) in order to adjust the lens to be in focus on a subject.

In this example, the focus adjustment unit 300 includes a carrier 310 that accommodates the lens barrel 200 therein and a focus adjustment driving part that generates a driving force to move the lens barrel 200 and the carrier 310 in the optical axis direction (the Z-axis direction).

The focus adjustment driving part includes a magnet 320a and a coil 330a.

Referring to FIG. 4, the magnet 320a is mounted on one side surface of the carrier 310.

In this example, the coil 330a is attached to the housing 120 via a board 130. Referring to FIG. 3, the coil 330a is mounted on the board 130 on an opposing surface of the housing 120 from a coil 452 of the shake compensation unit 400.

The magnet 320a may be a movable structure mounted on the carrier 310 and moving together with the carrier 310 in the optical axis direction (the Z-axis direction), and the coil 330a may be a stationary structure attached to the housing 120. However, positions of the magnet 320a and the coil 330a are not limited thereto, but may be exchanged with each other.

When power is applied to the coil 330a, the carrier 310 may be moved in the optical axis direction (the Z-axis direction) by electromagnetic interaction between the magnet 320a and the coil 330a.

Because the lens barrel 200 is accommodated inside the carrier 310, the lens barrel 200 may also be moved in the optical axis direction (the Z-axis direction) by moving the carrier 310.

While the carrier 310 is moving in the optical axis direction (the Z-axis direction), a rolling member 370 disposed between the carrier 310 and the housing 120 is used to decrease friction between the carrier 310 and the housing 120. In this example, the rolling member 370 has a ball shape.

The rolling member 370 may be disposed on both sides of the magnet 320a, as illustrated in FIG. 5.

A first yoke 350 may be disposed in the housing 120. Referring to FIG. 4, the first yoke 350 is disposed on an inner side surface of the housing 120 to face the magnet 320a with the coil 330a interposed therebetween.

An attractive force may act between the first yoke 350 and the magnet 320a in a direction perpendicular to the optical axis (the Z-axis).

Therefore, the rolling member 370 may maintain a state of contact with the carrier 310 and the housing 120 due to the attractive force between the first yoke 350 and the magnet 320a.

In addition, the first yoke 350 may serve to focus the magnetic force of the magnet 320a. Therefore, the generation of leakage magnetic flux may be prevented.

The first yoke 350 and the magnet 320a may form a magnetic circuit.

According to one example, a length of the first yoke 350 in the optical axis direction (the Z-axis direction) may be longer than that of the magnet 320a in the optical axis direction (the Z-axis direction).

In the event that the length of the first yoke 350 in the optical axis direction (the Z-axis direction) is set to be shorter than that of the magnet 320a in the optical axis direction (the Z-axis direction), when the magnet 320a moves in the optical axis direction (the Z-axis direction), attractive force acting on the center of the magnet 320a to direct the magnet 320a toward the center of the first yoke 350 may be increased.

Therefore, restoring force of the magnet 320a to allow the magnet 320a to return to an original position may be further increased, such that an amount of current required in order to move the magnet 320a may be increased, and power consumption may be increased.

However, in an example in which the length of the first yoke 350 in the optical axis direction (the Z-axis direction) is longer than that of the magnet 320a in the optical axis direction (the Z-axis direction), because the attractive force acting on the center of the magnet 320a to direct the magnet 320a toward the center of the first yoke 350 is relatively decreased, power consumption may be relatively decreased.

Meanwhile, a second yoke 340 is disposed between the carrier 310 and the magnet 320a.

The second yoke 340 may serve to focus magnetic force of the magnet 320a, thereby preventing the generation of leakage magnetic flux.

The second yoke 340 and the magnet 320a may form a magnetic circuit.

In this example, a closed loop control method of sensing a position of the lens barrel 200 is used to provide feedback regarding the position of the lens barrel 200.

Therefore, a position sensor 360 may be required for the closed loop control. The position sensor 360 may be a hall sensor.

The position sensor 360 may be disposed at an inner side or outer side of the coil 330a, and mounted on the board 130 on which the coil 330a is mounted.

In addition, the position sensor 360 may be formed integrally with a circuit element (as an example, Driver IC) providing a driving signal to the focus adjustment unit 300 (see FIG. 5). However, the position sensor 360 is not limited thereto, and the position sensor 360 and the circuit element may be provided as separate components, respectively.

When the camera module is turned on, the position sensor 360 may sense an initial position of the lens barrel 200. In addition, the lens barrel 200 may be moved from the sensed initial position to an initial setting position. The initial position may be a position of the lens barrel 200 in the optical axis direction when the camera module is turned on, and the initial setting position may be a position of the lens barrel 200 at which a focal length of the lens barrel 200 becomes infinite.

The lens barrel 200 may be moved from the initial setting position to a target position by a driving signal of the circuit element.

During the adjustment of the focus, the lens barrel 200 may be moved forwards and backwards along the optical axis direction (the Z-axis direction). This is, the lens barrel 200 may be bi-directionally moved along the optical axis direction (the Z-axis direction).

In order to secure sufficient driving force at the time of adjusting the focus, a magnet 320b and a coil 330b may be additionally utilized.

In the event that a mount area for a magnet is decreased in order to produce a slim camera module, it is possible that a size of the magnet may be also decreased so that it becomes difficult to secure a sufficient driving force.

However, according to the example provided above, the magnets 320a and 320b may be attached to different surfaces of the carrier 310, respectively, and the coils 330a and 330b may be provided on different surfaces of the housing 120, respectively, to face the magnets 320a and 320b, respectively, such that sufficient driving force required for focus adjustment may be secured even when the camera module is reduced in size to product a slim electronic product.

Figure 6:
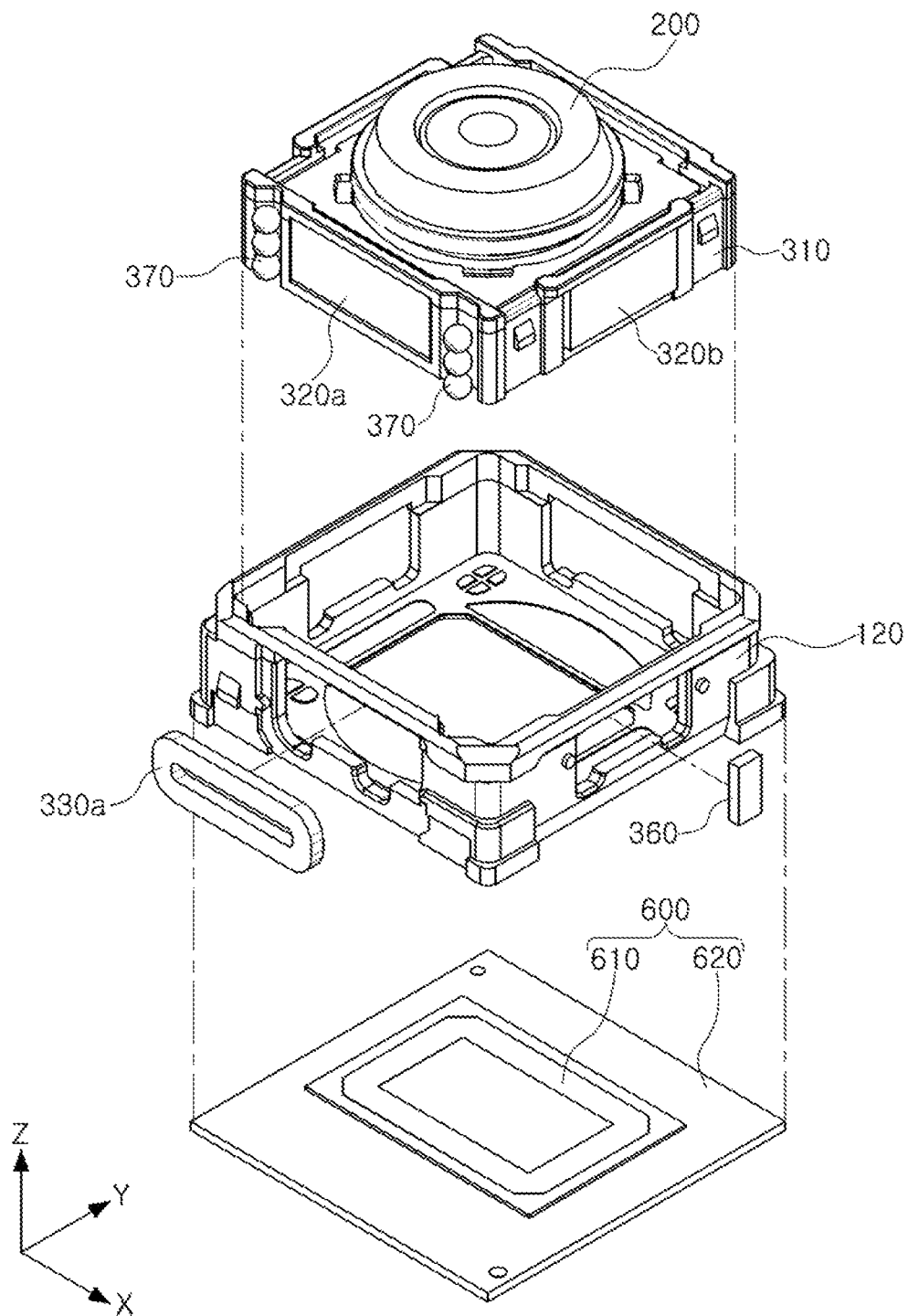
FIG. 6 is a schematic perspective view illustrating another example of a camera module.

FIG. 6 is a schematic perspective view illustrating another example of a focus adjustment unit of a lens driving apparatus.

Referring to FIG. 6, any one magnet of a plurality of magnets 320a and 320b mounted on different surfaces of the carrier 310 may face a coil 330a, and the other magnet thereof may face a position sensor 360.

In the example illustrated in FIG. 6, the magnet 320a faces the coil 330a, and the magnet 320b faces a position sensor 360. Therefore, the magnet 320a may serve as a driving magnet, and the magnet 320b may serve as a sensing magnet.

Further, because the coil 330a and the position sensor 360 are disposed on different surfaces of the housing 120 to be spaced apart from each other, a larger space may be secured to mount the coil 330a. Therefore, the number of turns for the coil 330a may be increased, and thus, driving force may be improved.

In addition, because the coil 330a and the position sensor 360 are disposed on different surfaces of the housing 120 to be spaced apart from each other, an influence of an electric field of the coil 330a on the position sensor 360 may be significantly decreased. Therefore, sensing accuracy of the position sensor 360 may be improved.

Figure 7:
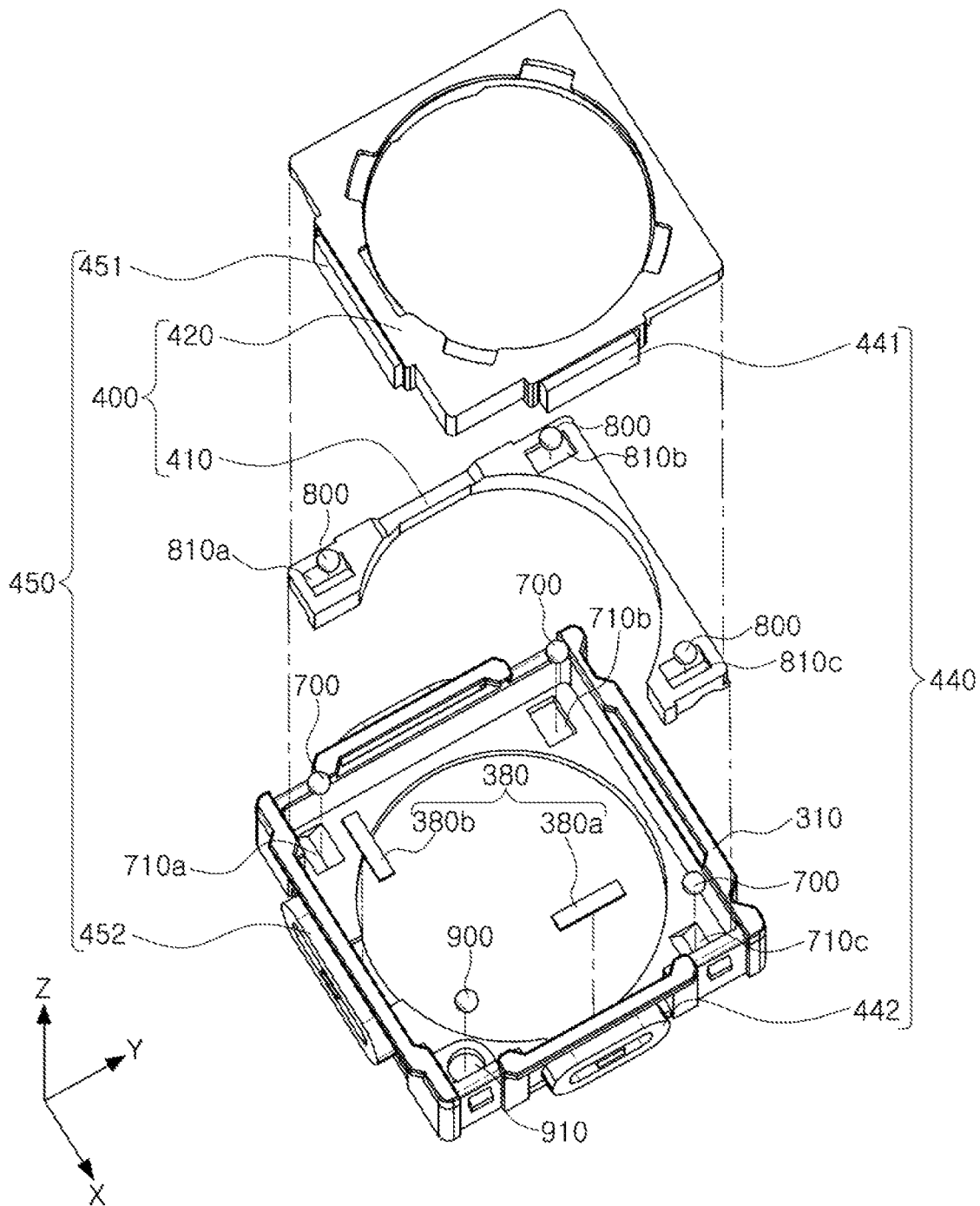
FIGS. 7 and 8 are exploded perspective views of an example of a shake compensation unit according to the camera module illustrated in FIG. 2.
Figure 8:
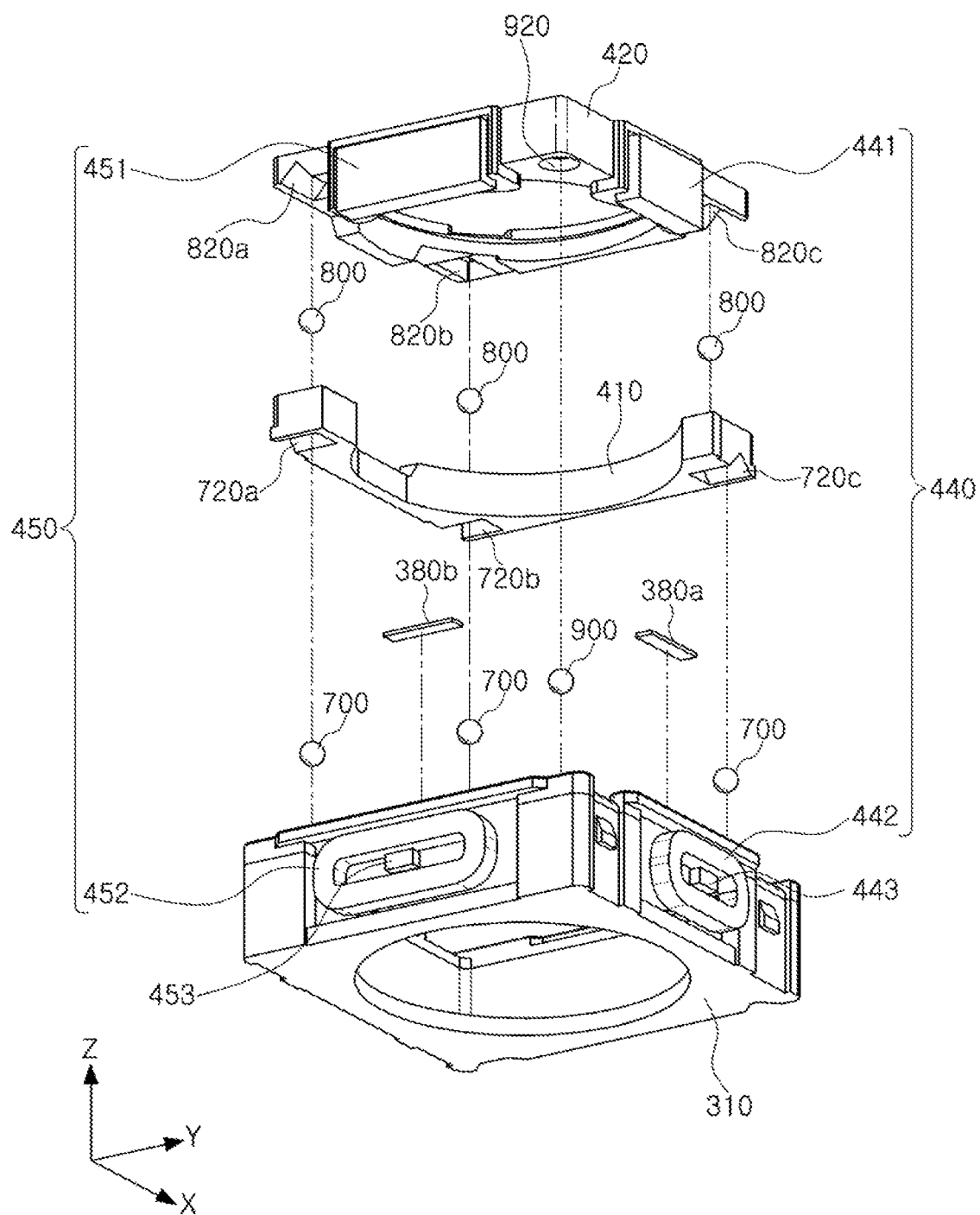

FIGS. 7 and 8 illustrate exploded perspective views of an example of a shake compensation unit according to FIG. 2.

The shake compensation unit 400 is used in order to correct image blurring or image distortion caused due to factors such as the shaking of a user's hand at the time of capturing still or moving images.

For example, at the time an image is captured, in the event that the camera is shaken by the instability of a user's hand or the like, the shake compensation unit 400 may impart relative displacement corresponding to the shaking of the hand to the lens barrel 200 in order to correct the blurring.

In order to compensate for the shaking of the camera module, the shake compensation unit 400 may move the lens barrel 200 in directions that are perpendicular to the optical axis (the Z-axis).

Referring to FIGS. 7 and 8, the shake compensation unit 400 includes a guide member that guides the movement of the lens barrel 200, and a shake compensation driving part that generates a driving force to move the guide member in directions that are perpendicular to the optical axis (the Z-axis).

In this example, the guide member includes a frame 410 and a lens holder 420. The frame 410 and the lens holder 420 are inserted into the carrier 310 to thereby be disposed in the optical axis direction (the Z-axis direction), and serve to guide the movement of the lens barrel 200.

The frame 410 and the lens holder 420 both include spaces or openings into which the lens barrel 200 may be inserted (see FIG. 2). The lens barrel 200 may be attached to the lens holder 420 so that the lens barrel 200 and the lens holder 410 moves together.

The frame 410 and the lens holder 420 may be moved inside the carrier 310 in a direction perpendicular to the optical axis (the Z-axis) by driving force generated in the shake compensation driving part.

The shake compensation driving part includes first and second shake compensation driving parts 440 and 450, and the first and second shake compensation driving parts 440 and 450 include magnets 441 and 451 and coils 442 and 452, respectively.

The first shake compensation driving part 440 may generate driving force in a first axis direction (an X-axis direction) perpendicular to the optical axis (the Z-axis), and the second shake compensation driving part 450 may generate driving force in a second axis direction (a Y-axis direction) perpendicular to the first axis (the X-axis).

In this example, the second axis (the Y-axis) is an axis perpendicular to both the optical axis (the Z-axis) and the first axis (the X-axis).

The first and second shake compensation driving parts 440 and 450 are disposed to be orthogonal to each other on a plane perpendicular to the optical axis (the Z-axis). For example, the magnet 441 of the first shake compensation driving part 440 and the magnet 451 of the second shake compensation driving part 450 are disposed to be orthogonal to each other on the plane perpendicular to the optical axis (the Z-axis).

The magnets 441 and 451 of the first and second shake compensation driving parts 440 and 450 are mounted on the lens holder 420, and the coils 442 and 452 facing the magnets 441 and 451, respectively, are mounted on the housing 120. For convenience of explanation, FIGS. 7 and 8 illustrate an example in which the coils 442 and 452 are disposed toward the carrier 310. However, as illustrated in FIG. 2, the coils 442 and 452 may be attached to the housing 120 via the board 130.

The magnets 441 and 451 may be movable structures that move together with the lens holder 420 in the directions perpendicular to the optical axis (the Z-axis), and the coils 442 and 452 may be stationary structures attached to the housing 120. However, the arrangements of the magnets 441 and 451 and the coils 442 and 452 are not limited thereto, but positions thereof may be interchangeable.

Meanwhile, a plurality of ball members supporting the shake compensation unit 400 are provided. The plurality of ball members may serve to guide the frame 410 and the lens holder 420 to compensate for the shaking of the camera. In addition, the plurality of ball members may serve to maintain intervals between carrier 310, the frame 410, and the lens holder 420.

The plurality of ball members include first and second ball members 700 and 800.

The first ball members 700 guide movement of the shake compensation unit 400 in the first axis direction (the X-axis direction), and the second ball members 800 guide movement of the shake compensation unit 400 in the second axis direction (the Y-axis direction).

For example, in response to a driving force being generated in the first axis direction (the X-axis direction), the first ball members 700 may be moved in a rolling motion in the first axis direction (the X-axis direction). Therefore, the first ball members 700 may guide the movement of the frame 410 and the lens holder 420 in the first axis direction (the X-axis direction).

Further, in response to a driving force being generated in the second axis direction (the Y-axis direction), the second ball members 800 may be moved in a rolling motion in the second axis direction (the Y-axis direction). Therefore, the second ball members 800 may guide the movement of the lens holder 420 in the second axis direction (the Y-axis direction).

The first ball members 700 include a plurality of ball members disposed between the carrier 310 and the frame 410, and the second ball members 800 include a plurality of ball members disposed between the frame 410 and the lens holder 420.

Referring to FIG. 7, first guide grooves 710a, 710b, 710c, 720a, 720b, and 720c that accommodate the first ball members 700 therein are formed in surfaces of the carrier 310 and the frame 410 facing each other in the optical axis direction (the Z-axis direction), respectively. The first guide grooves 710a, 710b, 710c, 720a, 720b, and 720c include a plurality of guide grooves.

The first ball members 700 are accommodated in the first guide grooves 710a, 710b, 710c, 720a, 720b, and 720c to thereby be inserted between the carrier 310 and the frame 410.

Because the first ball members 700 are accommodated in the first guide grooves 710a, 710b, 710c, 720a, 720b, and 720, the movement of the first ball members 700 is restricted in the optical axis direction (the Z-axis direction) and the second axis direction (the Y-axis direction). Thus, the first ball members 700 are movable only in the first axis direction (the X-axis direction). For example, the first ball members 700 may move in a rolling motion only in the first axis direction (the X-axis direction).

To this end, a plan view shape of each of the plurality of first guide grooves 710a, 710b, 710c, 720a, 720b, and 720c may be a rectangle of which a length in the first axis direction (the X-axis direction) is longer than a width thereof in the second axis direction (the Y axis direction).

Further, a cross-sectional shape of some of the plurality of first guide grooves 710a, 710b, 710c, 720a, 720b, and 720c may be different from that of the other guide grooves.

For example, a cross sectional shape of some guide grooves 710b and 720b of the plurality of first guide grooves 710a, 710b, 710c, 720a, 720b, and 720c may be substantially 'U' shape, but a cross-sectional shape of the other guide grooves 710a, 710c, 720a, and 720c may be substantially 'v' shape.

Figure 13:
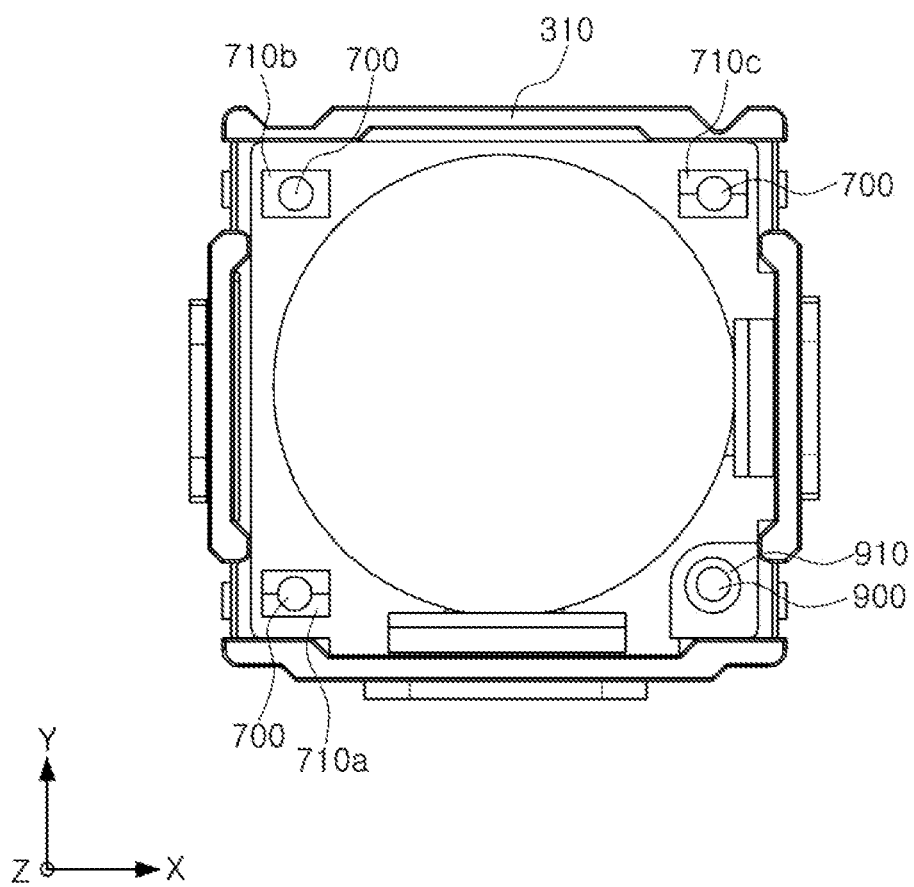
FIG. 13 is a plan view illustrating an example of a shake compensation unit in which first and third ball members are disposed on a carrier.

In this example, the guide grooves 710b and 720b having a substantially 'U' shaped cross section are guide grooves disposed to be farthest away from third guide grooves 910 and 920 among the plurality of first guide grooves 710a, 710b, 710c, 720a, 720b, and 720c (see FIGS. 7, 8, and 13).

Referring to FIG. 8, second guide grooves 810a, 810b, 810c, 820a, 820b, and 820c that accommodate the second ball members 800 therein are formed in surfaces of the frame 410 and the lens holder 420 facing each other in the optical axis direction (the Z-axis direction), respectively. The second guide grooves 810a, 810b, 810c, 820a, 820b, and 820c include a plurality of guide grooves.

The second ball members 800 are accommodated in the second guide grooves 810a, 810b, 810c, 820a, 820b, and 820c and are thereby inserted between the frame 410 and the lens holder 420.

Because the second ball members 800 are accommodated in the second guide grooves 810a, 810b, 810c, 820a, 820b, and 820c, the movement of the second ball members 800 is restricted in the optical axis direction (the Z-axis direction) and the first axis direction (the X-axis direction). Thus, the second ball members 800 are only movable in the second axis direction (the Y-axis direction). For example, the second ball members 800 may move in a rolling motion only in the second axis direction (the Y-axis direction).

To this end, a plan view shape of each of the plurality of second guide grooves 810a, 810b, 810c, 820a, 820b, and 820c may be a rectangle of which a length in the second axis direction (the Y-axis direction) is longer than a width thereof in the first axis direction (the X axis direction).

Further, a cross-sectional shape of some of the plurality of second guide grooves 810a, 810b, 810c, 820a, 820b, and 820c may be different from that of the other guide grooves.

For example, a cross sectional shape of some guide grooves 810b and 820b among the second guide grooves 810a, 810b, 810c, 820a, 820b, and 820c may be substantially 'U' shape, but a cross-sectional shape of the other guide grooves 810a, 810c, 820a, and 820c may be substantially 'v' shape.

Figure 14:
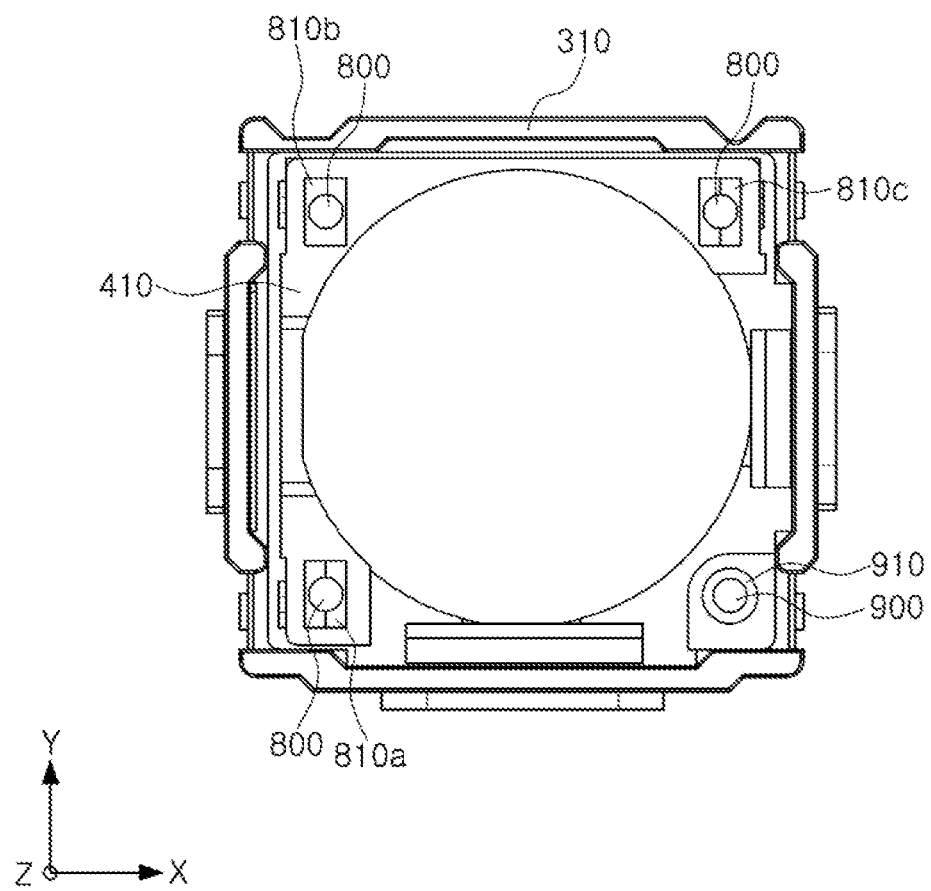
FIG. 14 is a plan view illustrating an example of a shake compensation unit in which a second ball member is disposed on a frame and a third ball member is disposed on a carrier.

In this example, the guide grooves 810b and 820b having a substantially 'U' shaped cross section are guide grooves disposed to be farthest away from the third guide grooves 910 and 920 among the plurality of second guide grooves 810a, 810b, 810c, 820a, 820b, and 820c (see FIGS. 7, 8, and 14).

Meanwhile, a third ball member 900 supporting movement of the lens holder 420 is provided between the carrier 310 and the lens holder 420.

The third ball member 900 may guide movement of the lens holder 420 in both the first axis direction (the X-axis direction) and the second axis direction (the Y-axis) direction.

For example, in response to a driving force being generated in the first axis direction (the X-axis direction), the third ball member 900 may move in a rolling motion along the first axis direction (the X-axis direction). Therefore, the third ball member 900 may guide movement of the lens holder 420 in the first axis direction (the X-axis direction).

Further, in response to a driving force being generated in the second axis direction (the Y-axis direction), the third ball member 900 may move in a rolling motion along the second axis direction (the Y-axis direction). Therefore, the third ball member 900 may guide movement of the lens holder 420 in the second axis direction (the Y-axis direction).

Meanwhile, the second and third ball members 800 and 900 may support the lens holder 420 while coming into contact with the lens holder 420. In this example, the second and third ball members 800 and 900 are positioned on different planes to each other (see FIGS. 8 and 11A through 12B).

Referring to FIG. 8, the magnets 441 and 451 of the first and second shake compensation driving parts 440 and 450 are provided on the lens holder 420, and the second and third ball members 800 and 900 are positioned on both sides of the respective magnets 441 and 451, respectively.

That is, the respective magnets 441 and 451 of the first and second shake compensation driving parts 440 and 450 are positioned between the ball members positioned on different planes from each other.

The third guide grooves 910 and 920 accommodating the third ball member 900 therein are formed in surfaces of the carrier 310 and the lens holder 420 facing each other in the optical axis direction (the Z-axis direction), respectively.

The third ball member 900 is accommodated in the third guide grooves 910 and 920 to thereby be inserted between the carrier 310 and the lens holder 420.

Because the third ball member 900 is accommodated in the third guide grooves 910 and 920, the movement of the third ball member 900 is restricted in the optical axis direction (the Z-axis direction), but the third ball member 900 may move in the rolling motion in both the first axis direction (the X-axis direction) and the second axis direction (the Y-axis direction).

To this end, a plan view shape of the third guide grooves 910 and 920 may be circular. Therefore, the plan view shape of the third guide grooves 910 and 920 and the plan view shapes of the first guide grooves 710a, 710b, 710c, 720a, 720b, and 720c and the second guide grooves 810a, 810b, 810c, 820a, 820b, and 820c differ from each other.

As a result, the first ball members 700 are movable in the rolling motion along the first axis direction (the X-axis direction), and the second ball members 800 are movable in the rolling motion along the second axis direction (the Y-axis direction). The third ball member 900 is movable in the rolling motion along both the first axis direction (the X-axis direction) and the second axis direction (the Y-axis direction).

Accordingly, a degree of freedom permitted for some of the plurality of ball members supporting the shake compensation unit 400 differ from a degree of freedom permitted for the remaining ball members.

Figure 9:
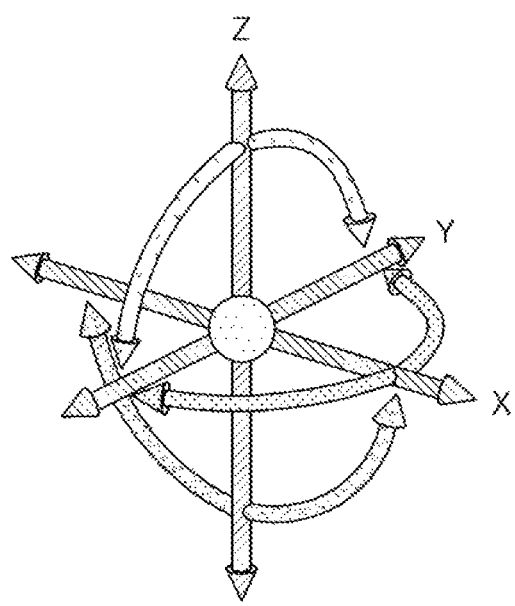
FIG. 9 is a conceptual view illustrating a degree of freedom of an object.
Figure 10:
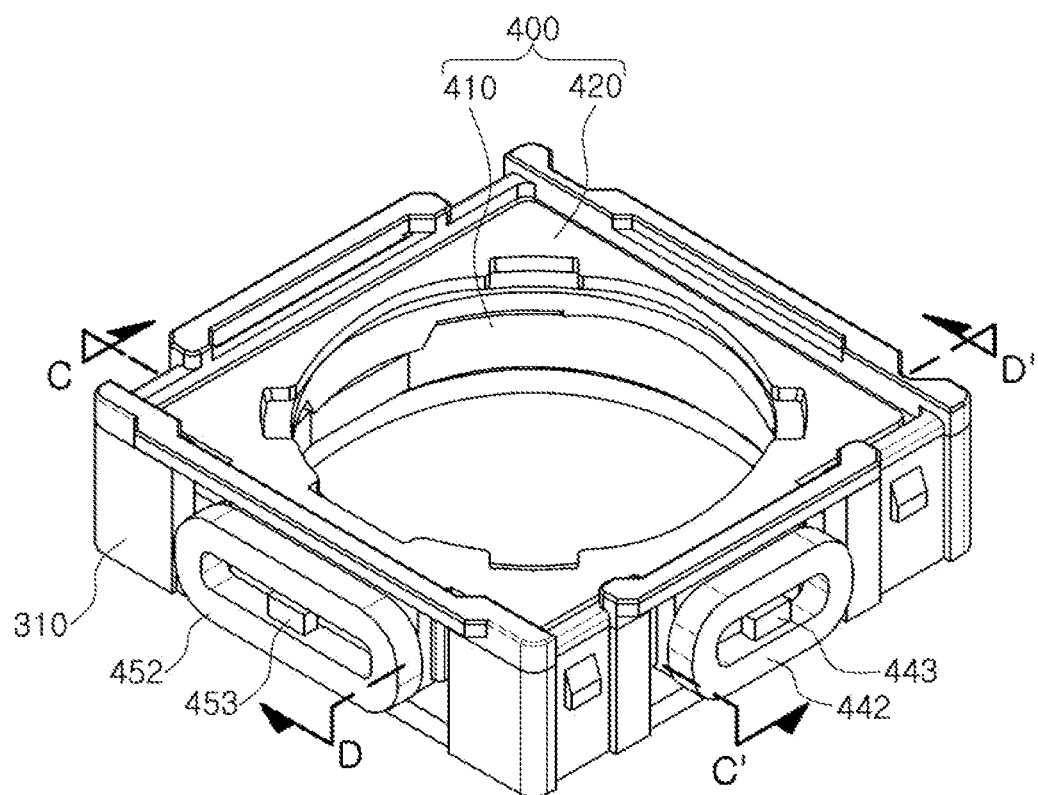
FIG. 10 is an assembled perspective view of an example of a shake compensation unit according to the camera module illustrated in FIG. 2.

Referring to FIG. 9, a degree of freedom of an object may correspond to the number of independent variables required to indicate a movement state of the object in a three-dimensional coordinate system.

Generally, a degree of freedom of an object in a three-dimensional coordinate system is 6. The movement of the object may be represented by an orthogonal coordinate system in three directions and a rotary coordinate system in three directions.

For example, the object may move in a translational motion in each of the axis directions (the X-axis direction, the Y-axis direction, and the Z-axis direction) and move in a rotational motion with respect to each of the axes (the X-axis, the Y-axis, and the Z-axis).

In the present specification, the degree of freedom may refer to the number of independent variables required to indicate movement of the first to third ball members 700, 800, and 900 when the shake compensation unit 400 is moving due to a driving force generated in the directions perpendicular to the optical axis (the Z-axis) by power applied to the shake compensation unit 400.

Figure 15A:
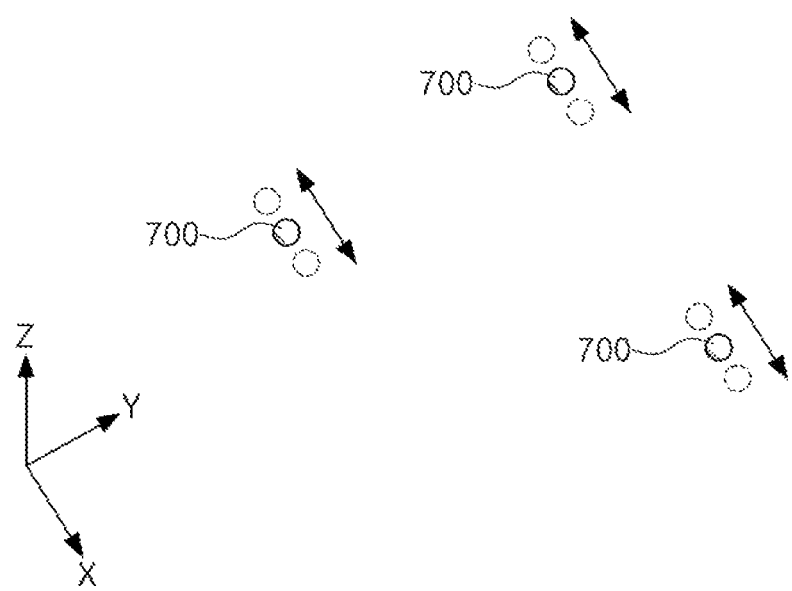
FIG. 15A is a perspective view illustrating movements of first ball members according to an example of a camera module.
Figure 15B:
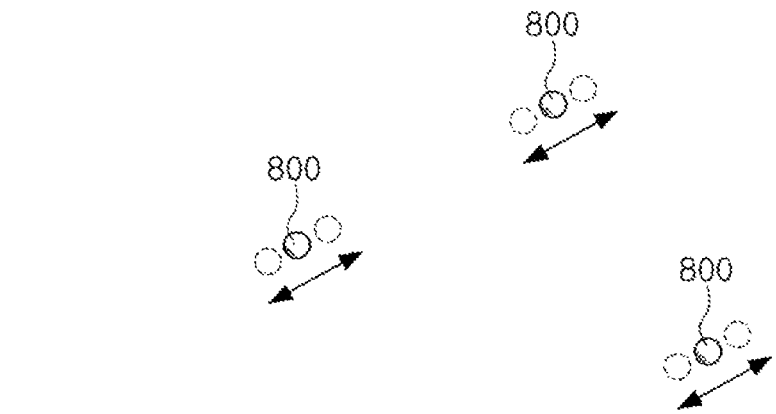
FIG. 15B is a perspective view illustrating movements of second ball members according to an example of a camera module.
Figure 15B:
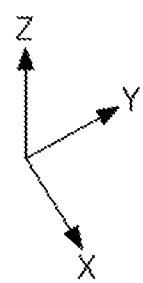
Figure 15C:
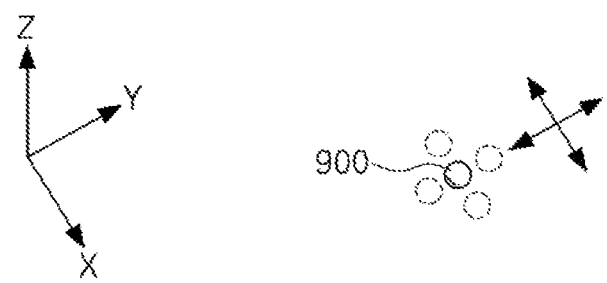
FIG. 15C is a perspective view illustrating movements of a third ball member according to an example of a camera module.

For example, the third ball member 900 may move in a rolling motion in two axis directions (the first axis direction (the X-axis direction) and the second axis direction (the Y-axis direction)) (see FIG. 15C), while the first and second ball members 700 and 800 may move in a rolling motion along one axis direction, which may be the first axis direction (the X-axis direction) or the second axis direction (the Y-axis direction) (see FIGS. 15A and 15B) in response to a driving force generated in a direction perpendicular to the optical axis (the Z-axis).

Therefore, in this example, the degree of freedom of the third ball member 900 is greater than those of the first and second ball members 700 and 800.

The movement of the first to third ball members 700, 800, and 900 in response to a driving force generated in a direction perpendicular to the optical axis (the Z-axis) will be described with reference to FIGS. 10 through 12B.

Figure 11A:
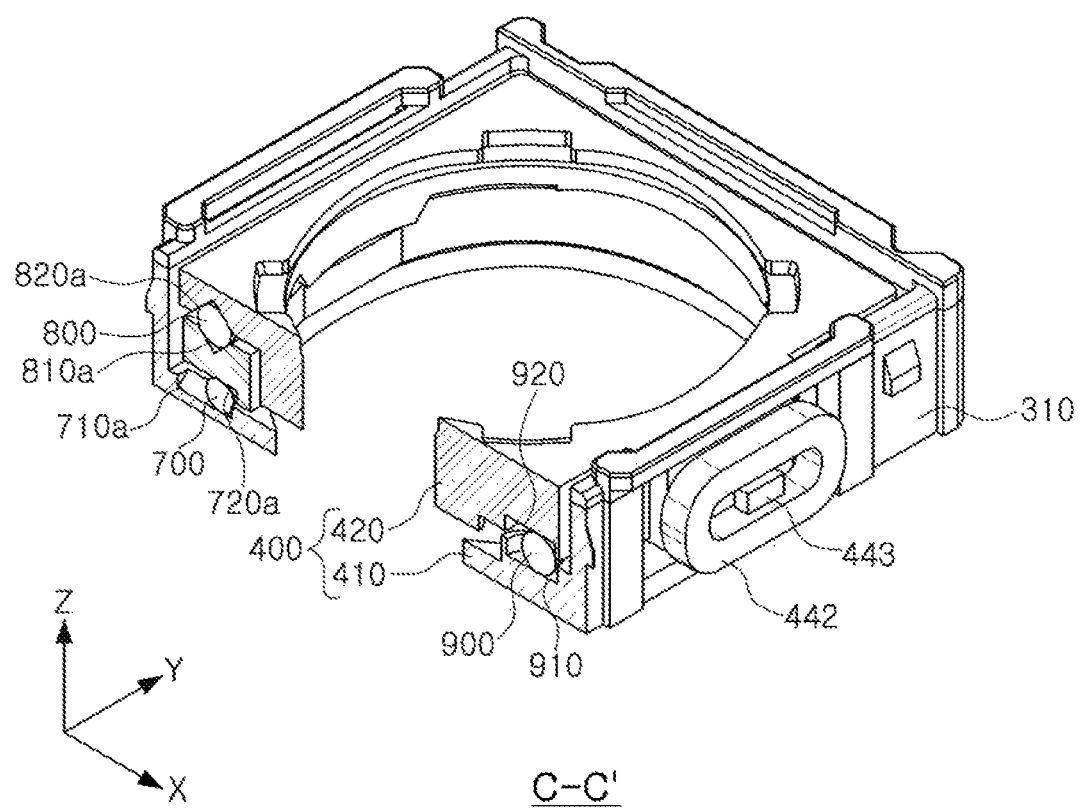
FIG. 11A is a cut-away perspective view of an example of a camera module taken along line C-C' of FIG. 10.
Figure 11B:
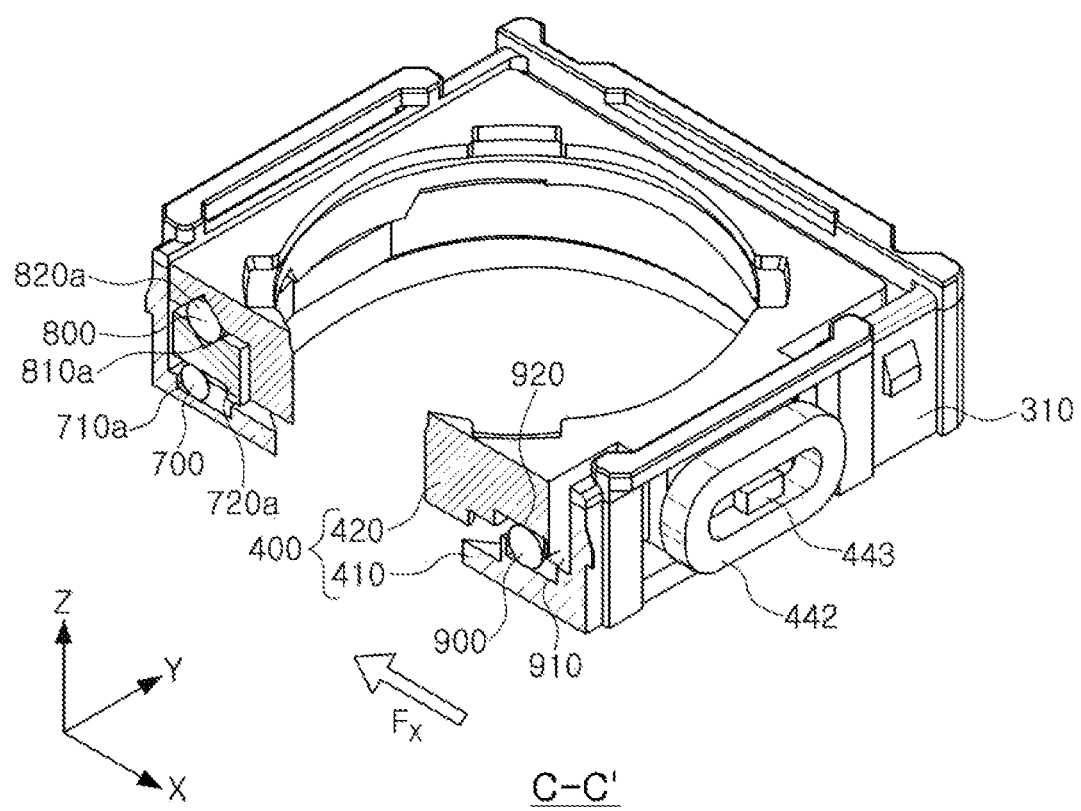
FIG. 11B is a perspective view illustrating an operation mechanism of an example of a shake compensation unit using a driving force generated in an X-axis direction.

In response to a driving force Fx being generated in the first axis direction (the X-axis direction) as illustrated in FIG. 11B, the frame 410 and the lens holder 420 may move together in the first axis direction (the X-axis direction).

The first and third ball members 700 and 900 may move in a rolling motion in the first axis direction (the X-axis direction) to allow the lens holder 420 to move in the first axis direction (the X-axis direction). In this example, the movement of the second ball members 800 is restricted in the first axis direction (the X-axis direction).

Figure 12A:
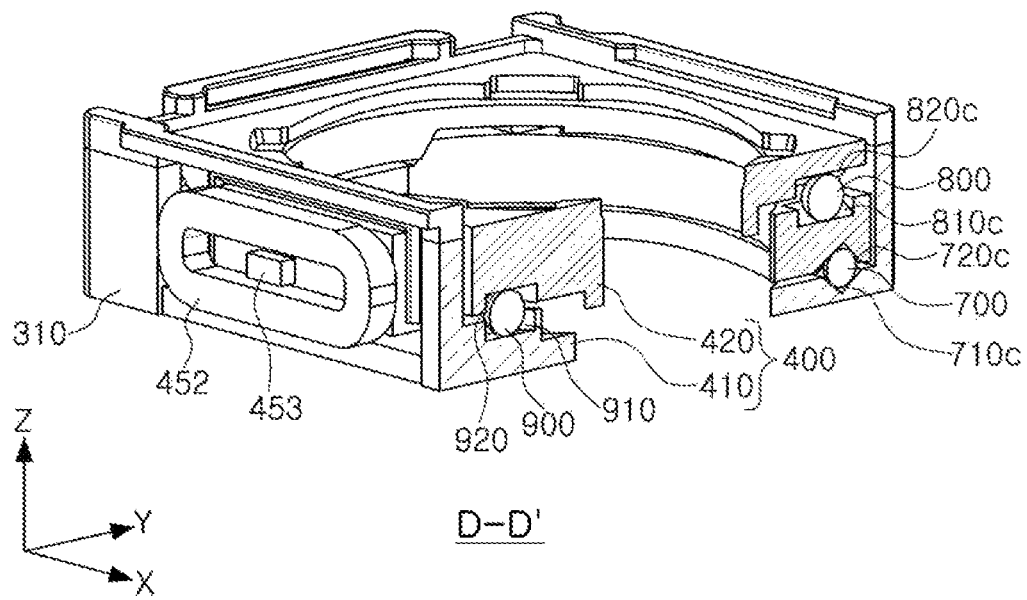
FIG. 12A is a cut-away perspective view of an example of a shake compensation unit taken along line D-D' of FIG. 10.
Figure 12B:
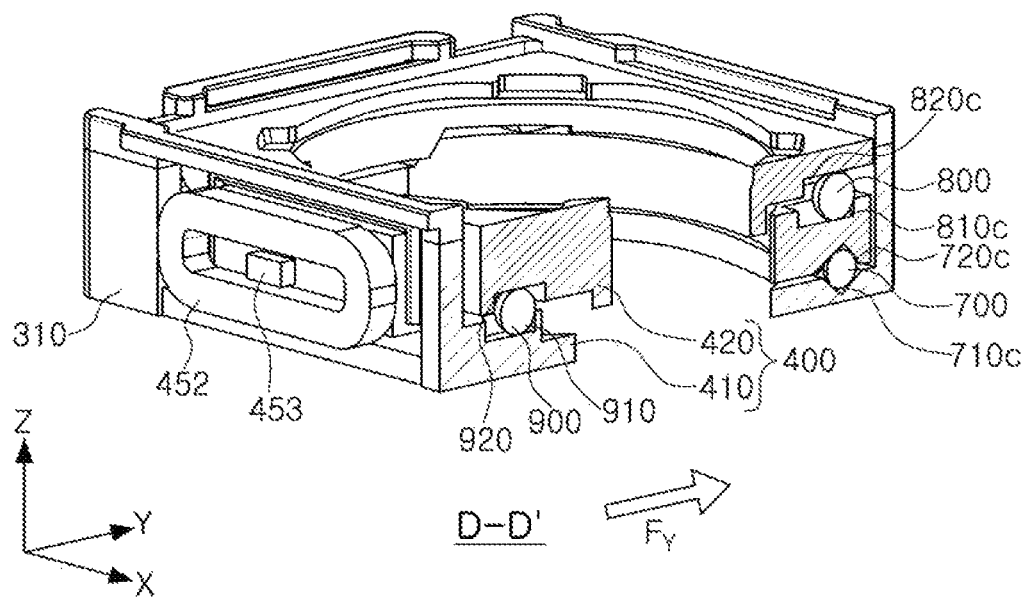
FIG. 12B is a perspective view illustrating an operation mechanism of an example of a shake compensation unit using a driving force generated in a Y-axis direction.

Further, in response to a driving force Fy being generated in the second axis direction (the Y-axis direction) as illustrated in FIG. 12B, the lens holder 420 may move in the second axis direction (the Y-axis direction).

The second and third ball members 800 and 900 may move in a rolling motion in the second axis direction (the Y-axis direction). In this example, the movement of the first ball member 700 is restricted in the second axis direction (the Y-axis direction).

The rotation of the frame 410 and the lens holder 420 based on the optical axis (the Z-axis) may be prevented by restricting the movement of some of the ball members as described above while a compensation is being performed for camera instability.

Because the inadvertent shaking of the camera module rapidly occurs at a rate of several ten Hz per second, the shake compensation unit 400 may be continuously moved in the first axis direction (the X-axis direction) and the second axis direction (the Y-axis direction). Therefore, because it is difficult to allow driving force generated in the first axis direction (the X-axis direction) and the second axis direction (the Y-axis direction) to be continually applied to the center of the shake compensation unit 400, there is a risk that the shake compensation unit 400 will be rotated based on the optical axis (the Z-axis) during the compensation to remove the effect of the shaking of the camera module.

For example, in the event that all of the ball members are configured to be movable in a rolling motion in both the first axis direction (the X-axis direction) and the second axis direction (the Y-axis direction), there is a risk that the shake compensation unit 400 will be rotated about the optical axis (the Z-axis), which may deteriorate image quality.

However, according to the example illustrated in FIGS. 7 and 9, the movement of some of the ball members is restricted during the compensation of the camera shaking, such that a rotation of the shake compensation unit 400 about the optical axis (the Z-axis) may be prevented by a mechanical structure.

Meanwhile, when ball members moved in the rolling motion in the first axis direction (the X-axis direction) are referred to as the first ball members and ball members moved in the rolling motion in the second axis direction (the Y-axis direction) are referred to as the second ball members, the ball member (the above-mentioned third ball member 900) disposed between the carrier 310 and the lens holder 420 may serve as the first ball member when the shake compensation unit 400 is moved in the first axis direction (the X-axis direction), and serve as the second ball member when the shake compensation unit 400 is moved in the second axis direction (the Y-axis direction).

Therefore, in this example, the first and second ball members may share the third ball member with each other.

In the lens driving apparatus 500, the closed loop control method of sensing the position of the lens barrel 200 to provide the feedback may be used to compensate for the shaking of the camera.

Therefore, position sensors 443 and 453 for a closed loop control may be provided. In the example illustrated in FIGS. 8 and 10, the position sensors 443 and 453 are disposed inside the coils 442 and 452 of the first and second shake compensation driving parts 440 and 450.

The position sensors 443 and 453 may be hall sensors. The position sensors 443 and 453 may sense the position of the lens barrel 200 through the magnets 441 and 451 of the first and second shake compensation driving parts 440 and 450.

Meanwhile, a yoke part 380 maintains a state of contact between the shake compensation unit 400 and the plurality of ball members.

The yoke part 380 is attached to the carrier 310 so as to face the magnets 441 and 451 of the first and second shake compensation driving parts 440 and 450 in the optical axis direction (the Z-axis direction).

Therefore, an attractive force may be generated between the yoke part 380 and the magnets 441 and 451 in the optical axis direction (the Z-axis direction).

Because the shake compensation unit 400 is pressed in a direction toward the yoke part 380 by the attractive force between the yoke part 380 and the magnets 441 and 451, the frame 410 and the lens holder 420 of the shake compensation unit 400 maintains a state of contact with the plurality of ball members.

For example, the lens holder 420 is pressed toward the frame 410 by the attractive force between the yoke part 380 and the magnets 441 and 451, and thus, the frame 410 is pressed toward the carrier 310.

In this example, the yoke part 380 includes first and second yoke parts 380*a* and 380*b*. The yoke part 380 may be formed of a material capable of generating attractive force between the yoke part 380 and the magnets 441 and 451. For example, the yoke part 380 may be formed of a magnetic material.

The first yoke part 380*a* faces the magnet 441 of the first shake compensation driving part 440 in the optical axis direction (the Z-axis direction), and the second yoke part 380*b* faces the magnet 451 of the second shake compensation driving part 450 in the optical axis direction (the Z-axis direction).

The lengths of the first and second yoke parts 380*a* and 380*b* in the directions perpendicular to the optical axis (the Z-axis) may be equal to or shorter than those of the magnets 441 and 451 in the directions perpendicular to the optical axis (the Z-axis). In this case, in response to the magnets 441 and 451 being moved in directions perpendicular to the optical axis (the Z-axis), a restoring force to return to the original positions may be further increased by the attractive force between the magnets 441 and 451 and the yoke part 380.

To compensate for the shaking of the camera module 1000, there is a need to instantly correspond to an unstable movement of the camera module generated due to a user's hand movement or the like. That is, the lens barrel 200 may have to be continuously moved in the first axis direction (the X-axis direction) and the second axis direction (the Y-axis direction).

For example, because the shaking of the camera module occurs rapidly at a rate of several tens of Hz per second, it may be difficult to generate vibrations that correspond to the shaking of the camera module using only electromagnetic force between the magnets 441 and 451 and the coils 442 and 452.

Therefore, the lens barrel 200 may be moved in the first axis direction (the X-axis direction) and the second axis direction (the Y-axis direction) by simultaneously using the restoring force acting between the magnets 441 and 451 and the yoke part 380 and the electromagnetic force between the magnets 441 and 451 and the coils 442 and 452.

Therefore, the position of the lens barrel 200 may be continuously adjusted, corresponding to the shaking, which may be further decrease power consumption.

When the camera module is turned on, the initial position (position in the directions perpendicular to the optical axis (the Z-axis)) of the lens barrel 200 may be sensed by the position sensors 443 and 453. In addition, the lens barrel 200 may be moved from the sensed initial position to a setting position.

The setting position may be the center of a movable range in the first axis direction (the X-axis direction) and the center of a movable range in the second axis direction (the Y-axis direction). Mechanically, the setting position may be the center of the carrier 310 in which the shake compensation unit 400 is accommodated in the first axis direction (the X-axis direction) and in the second axis direction (the Y-axis direction).

When the camera module is not shaken, there is a need to fix the lens barrel 200 so as not to be moved in the first axis direction (the X-axis direction) and the second axis direction (the Y-axis direction).

According to this example, because the yoke part 380 attracts the magnets 441 and 451 in the optical axis direction (the Z-axis direction), when a shake compensation signal is not applied, the lens barrel 200 may be maintained in a state in which the lens barrel 200 is fixed in a predetermined position in the directions perpendicular to the optical axis (the Z-axis) by the attractive force between the yoke part 380 and the magnets 441 and 451.

However, because each of the components of the camera module is accompanied with a manufacturing tolerance, in a case of only fixing the lens barrel 200 with the attractive force between the yoke part 380 and the magnets 441 and 451, there is a risk that the optical axis (the Z-axis) of the lens may be misaligned with the center of the image sensor 610, which may deteriorate image quality.

In addition, it may be difficult to maintain the lens barrel 200 to be in a fixed state only by the attractive force between the yoke part 380 and the magnets 441 and 451.

Therefore, when the camera module is turned on, the position of the lens barrel 200 (in the directions perpendicular to the optical axis (the Z-axis)) may be adjusted so that the lens barrel 200 is mechanically positioned at the center in the directions perpendicular to the optical axis (the Z-axis).

Therefore, when the camera module is not shaking while the camera module is turned on, the lens barrel 200 may be maintained in a state in which the lens barrel 200 is mechanically fixed to the center in the directions perpendicular to the optical axis (the Z-axis) by the attractive force between the yoke part 380 and the magnets 441 and 451 and the driving force of the first and second shake compensation driving parts 440 and 450.

Meanwhile, while the camera module is turned off, the position of the lens barrel 200 may be fixed by the attractive force between the yoke part 380 and the magnets 441 and 451.

In this example, the yoke part 380 is provided so that the frame 410 and the lens holder 420 may maintain the state of contact with the plurality of ball members. In addition, as illustrated in FIG. 2, a stopper 210 is provided to prevent the plurality of ball members, the frame 410, and the lens holder 420 from being separated to the outside of the carrier 310 by external impacts or the like.

The stopper 210 is coupled to the carrier 310 to at least partially cover an upper surface of the lens holder 420.

Meanwhile, when an optical image stabilization function is provided in a camera, because guide members guiding a lens barrel are additionally provided in a carrier 310 of a camera module, the sizes of the lens driving apparatus and the camera module tend to increase in comparison to cases in which the optical image stabilization function is not provided in a camera module.

For instance, in general, because a frame and the lens holder are sequentially disposed in the carrier in the optical axis direction (the Z-axis direction), the size of the lens driving apparatus 500 and the thickness of the camera module 1000 are increased in comparison to cases in which a frame and a lens holder are not provided.

However, according to the example illustrated in FIG. 2, the lens driving apparatus 500 and the camera module 1000 are configured to provide the compensation function for the shaking of camera module without increasing the sizes of the lens driving apparatus 500 and the camera module 1000.

The plan view shapes of the frame 410 and the lens holder 420 may be different from each other. The positions of the centers of gravity of the frame 410 and the lens holder 420 may be also different from each other.

For example, the plan view shape of the frame 410 may be a substantially '¬' shape or an L-bracket shape, and the plan view shape of the lens holder 420 may be a substantially '▫' shape or a rectangular shape with an opening in the center.

Therefore, a region in which the frame 410 is positioned and a region in which the frame 410 is not positioned may exist in a region in the optical axis direction (the Z-axis direction) between the carrier 310 and the lens holder 420.

For example, when viewed in the optical axis direction (the Z-axis direction), there are a region in which the frame 410 and the lens holder 420 overlap each other and a region in which the frame 410 and the lens holder 420 do not overlap each other.

The region in which the frame 410 and the lens holder 420 overlap each other in the optical axis direction (the Z-axis direction) is a region in which the frame 410 is positioned between the carrier 310 and the lens holder 420.

The region in which the frame 410 and the lens holder 420 do not overlap each other in the optical axis direction (the Z-axis direction) is a region in which the frame 410 is not positioned between the carrier 310 and the lens holder 420. Therefore, the carrier 310 and the lens holder 420 directly face each other in the optical axis direction (the Z-axis direction) in this region.

The magnets 441 and 451 of the first and second shake compensation driving parts 440 and 450 and the yoke part 380 are disposed in the region in which the carrier 310 and the lens holder 420 directly face each other in the optical axis direction (the Z-axis direction).

That is, the frame 410 has an opening in a region in which the magnets 441 and 451 of the first and second shake compensation driving parts 440 and 450 and the yoke part 380 face each other in the optical axis direction (the Z-axis direction).

Therefore, the frame 410 is not positioned between the magnets 441 and 451 of the first and second shake compensation driving parts 440 and 450 and the yoke part 380 in the optical axis direction (the Z-axis direction), and thus, the magnets 441 and 451 are positioned close to the yoke part 380.

According to this example, the region in which the frame 410 is not positioned between the carrier 310 and the lens holder 420 is obtained by allowing the frame 410 and the lens holder 420 to have different plan view shapes from each other, and the magnets 441 and 451 are positioned closer to the yoke part 380 by disposing the magnets 441 and 451 and the yoke part 380 in this region.

Therefore, the lens driving apparatus 500 and camera module 1000 may provide a shake compensation function without increasing the sizes or heights of the lens driving apparatus 500 and camera module 1000 in the optical axis direction (the Z-axis directions).

In this example, the mounting surfaces of the lens holder 420 on which the magnets 441 and 451 are mounted may further protrude toward a bottom surface of the carrier 310 as compared to the other portions of the lens holder 420.

Meanwhile, the third ball member 900 is disposed between the carrier 310 and the lens holder 420 to support the lens holder 420.

Because the magnets 441 and 451 of the first and second shake compensation driving parts 440 and 450 are mounted on one surface and another surface of the lens holder 420 to be orthogonal to each other, and the attractive force may act between the magnets 441 and 451 and the yoke part 380, a pressing force biased toward the yoke part 380 may be applied to the lens holder 420.

In this case, since the frame 410 is not disposed in the region in which the attractive force acts between the magnets 441 and 451 and the yoke part 380, the lens holder 420 may be inclined by the attractive force between the magnets 441 and 451 and the yoke part 380.

However, according to the example illustrated in FIG. 2, the third ball member 900 is disposed between the carrier 310 and the lens holder 420 to prevent the lens holder 420 from being inclined.

Because the third ball member 900 directly supports the lens holder 420 between the carrier 310 and the lens holder 420, the third ball member 900 may guide movement of the lens holder 420 in both the first axis direction (the X-axis direction) and the second axis direction (the Y-axis direction).

As described above, the frame 410 is not disposed in the region in which the attractive force acts between the magnets 441 and 451 and the yoke part 380, but the lens holder 420 is supported by the third ball member 900 by disposing the third ball member 900 in the region in which the frame 410 is not disposed. Thus, the lens driving apparatus 500 and camera module 1000 provide a shake compensation function without increasing the sizes (heights) of the lens driving apparatus 500 and camera module 1000 in the optical axis direction (the Z-axis directions).

Because the biased pressing force is applied to the lens holder 420, levels of strength of the pressing force applied to the second and third ball members 800 and 900 supporting the lens holder 420 may be different from each other.

For example, because the pressing force applied to the lens holder 420 is largest in the region in which the magnets 441 and 451 and the yoke part 380 face each other, the intensity of the pressing force applied to the third ball member 900 may be greater than that of the pressing force applied to the second ball member 800.

Further, the intensity of the pressing force applied to the third ball member 900 may also be greater than that of the pressing force applied to the first ball member 700.

As described above, the cross-sectional shape of the guide grooves disposed farthest away from the third guide grooves 910 and 920 accommodating the third ball member 900 to which the maximum pressing force is applied may differ from that of the guide grooves disposed to be closer to the third grooves 910 and 920.

Meanwhile, as shown in FIG. 1, because the sizes of the lens driving apparatus 500 and the camera module 1000 according to the present example are decreased, the lens barrel 200 may partially protrude outside the case 110.

FIG. 2 illustrates that, even when the lens barrel 200 is positioned at its lowermost position in the housing 120 along the optical axis direction (the Z-axis direction), the lens barrel 200 partially protrudes outside the case 110.

As set forth above, the lens driving apparatus and the camera module including the same may be miniaturized while providing the shake compensation function.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving apparatus comprising:
    a housing;
    a carrier accommodated in the housing and configured to be movable in an optical axis direction;
    a frame and a lens holder accommodated in the carrier and configured to be movable together with the carrier in the optical axis direction;
    a lens barrel attached to the lens holder;
    a first shake compensation driving part, comprising a first magnet disposed in the lens holder and a first coil facing the first magnet, configured to generate a first driving force in a first axis direction perpendicular to an optical axis;
    a second shake compensation driving part, comprising a second magnet disposed in the lens holder and a second coil facing the second magnet, configured to generate a second driving force in a second axis direction perpendicular to the first axis direction;
    a focus adjustment driving part comprising a third magnet disposed in the carrier and a third coil facing the third magnet;
    a yoke part disposed in the carrier to generate attracting force in the optical axis direction with respect to the first magnet and the second magnet;
    a first ball member disposed between the carrier and the frame and to be movable in a rolling motion in the first axis direction;
    a second ball member disposed between the frame and the lens holder and to be movable in a rolling motion in the second axis direction; and
    a third ball member disposed between the carrier and the lens holder and to be movable in a rolling motion in both the first axis direction and the second axis direction,
    wherein the third ball member directly faces the carrier and the lens holder, and
    wherein an opening is provided to a portion of the frame corresponding to a region in which the carrier and the lens holder directly face each other in the optical axis direction.

2. The lens driving apparatus of claim 1, wherein a plan view shape of the frame has '¬' shape or an L-bracket shape.

3. The lens driving apparatus of claim 1, wherein the first shake compensation driving part further comprises a first position sensor facing the first magnet.

4. The lens driving apparatus of claim 1, wherein the second shake compensation driving part further comprises a second position sensor facing the second magnet.

5. The lens driving apparatus of claim 1, wherein the focus adjustment driving part further comprises a third position sensor facing the third magnet.

6. The lens driving apparatus of claim 1, wherein a stopper is coupled to the carrier to at least partially cover an upper surface of the lens holder.

7. The lens driving apparatus of claim 1, wherein the yoke part comprises a first yoke part facing the first magnet in the optical axis direction and a second yoke part facing the second magnet in the optical axis direction.

8. The lens driving apparatus of claim 1, wherein the frame and the lens holder are configured to be movable together in the first axis direction, and wherein the lens holder is configured to be movable in the second axis direction.

9. The lens driving apparatus of claim 1, wherein a first guide groove part is disposed in surfaces of the carrier and the frame facing each other in the optical axis direction, respectively,
    wherein a second guide groove part is disposed in surfaces of the frame and the lens holder facing each other in the optical axis direction, respectively, and
    wherein a third guide groove part is disposed in surfaces of the carrier and the lens holder facing each other in the optical axis direction, respectively.

10. The lens driving apparatus of claim 9, wherein the third guide groove part has a different shape from the first guide groove part and the second guide groove part.

11. The lens driving apparatus of claim 9, wherein the first guide groove part comprises a plurality of guide grooves,
    wherein some guide grooves among the plurality of guide grooves have a 'U' shaped cross section, and
    wherein other guide grooves among the plurality of guide grooves have a 'v' shaped cross section.

12. The lens driving apparatus of claim 11, wherein the some guide grooves having the 'U' shaped cross section are guide grooves disposed to be farthest away from the third guide groove part, among the plurality of guide grooves of the first guide groove part.

13. The lens driving apparatus of claim 9, wherein the second guide groove part comprises a plurality of guide grooves,
    wherein some guide grooves among the plurality of guide grooves have a 'U' shaped cross section, and
    wherein other guide grooves among the plurality of guide grooves have a 'v' shaped cross section.

14. The lens driving apparatus of claim 13, wherein the some guide grooves having the 'U' shaped cross section are guide grooves disposed to be farthest away from the third guide groove part, among the plurality of the guide grooves of the second guide groove part.

\* \* \* \* \*